(12) United States Patent
Frieden et al.

(10) Patent No.: US 7,092,942 B2
(45) Date of Patent: Aug. 15, 2006

(54) MANAGING SECURE RESOURCES IN WEB RESOURCES THAT ARE ACCESSED BY MULTIPLE PORTALS

(75) Inventors: Kurt Frieden, Berkeley, CA (US); Mitchell B. Rudominer, El Cerrito, CA (US); Matthew S. Markoff, Chappaqua, NY (US)

(73) Assignee: Bea Systems, Inc., San Jose, CA (US)

( * ) Notice: Subject to any disclaimer, the term of this patent is extended or adjusted under 35 U.S.C. 154(b) by 94 days.

(21) Appl. No.: 10/159,532

(22) Filed: May 31, 2002

(65) Prior Publication Data

US 2003/0225765 A1  Dec. 4, 2003

(51) Int. Cl.
G06F 17/30 (2006.01)
(52) U.S. Cl. .................. 707/9; 726/4; 726/28; 726/29
(58) Field of Classification Search .................. 707/9; 709/200; 713/200, 201; 726/3, 4, 12, 27–29
See application file for complete search history.

(56) References Cited

U.S. PATENT DOCUMENTS

| | | |
|---|---|---|
| 5,754,755 A | 5/1998 | Smith, Jr. |
| 5,819,271 A | 10/1998 | Mahoney et al. |
| 5,870,542 A * | 2/1999 | Ander et al. ............ 713/200 |
| 5,894,554 A | 4/1999 | Lowery et al. |
| 5,907,837 A | 5/1999 | Ferrel et al. |
| 5,970,143 A | 10/1999 | Schneier et al. |
| 5,974,445 A | 10/1999 | Pivnichny et al. |
| 6,014,137 A | 1/2000 | Burns |
| 6,014,638 A | 1/2000 | Burge et al. |
| 6,026,433 A | 2/2000 | D'Arlach et al. |
| 6,065,120 A | 5/2000 | Laursen et al. |
| 6,088,451 A | 7/2000 | He et al. |
| 6,112,192 A | 8/2000 | Capek et al. |
| 6,128,663 A | 10/2000 | Thomas |
| 6,134,548 A | 10/2000 | Gottsman et al. |

(Continued)

OTHER PUBLICATIONS

Method for Providing Personalized Information on the Web, IBM TDB, Oct. 1997, vol. 40, No. 10, pp. 3-6.

(Continued)

*Primary Examiner*—Jack M Choules
(74) *Attorney, Agent, or Firm*—Jackson & Co., LLP; Andrew V. Smith

(57) ABSTRACT

A method, apparatus, and computer-readable media for authorizing users of network portals to access a secure resource hosted by a secure server comprises storing a plurality of user identifiers, each representing a user of an owning portal; storing for each of the user identifiers an access privilege to the secure resource; storing a proxy user identifier representing a guest portal and a guest access privilege to the secure resource for all of the users of the guest portal; receiving from the owning portal a first request for access to the secure resource, the first request comprising a first user identifier representing a user of the owning portal; granting to the user of the owning portal access to the secure resource according to the access privilege stored for the first user identifier; receiving from the guest portal a second request for access to the secure resource, the second request comprising a second user identifier representing a user of the guest portal and a portal identifier representing the guest portal; and granting to the user of the guest portal access to the secure resource according to the guest access privilege stored in the authorization table for the proxy user identifier.

18 Claims, 4 Drawing Sheets

U.S. PATENT DOCUMENTS

| | | | |
|---|---|---|---|
| 6,161,126 | A | 12/2000 | Wies et al. |
| 6,185,614 | B1 | 2/2001 | Cuomo et al. |
| 6,249,873 | B1 | 6/2001 | Richard et al. |
| 6,327,628 | B1* | 12/2001 | Anuff et al. ............... 709/311 |
| 6,460,084 | B1* | 10/2002 | Van Horne et al. ......... 709/227 |
| 2002/0104018 | A1* | 8/2002 | Singhani et al. ............ 713/201 |

OTHER PUBLICATIONS

Kerberos Papers and Documentation, http://web.mit.edu/kerberos/www/papers.html.

T. Dierks, et al., The TLS Protocol Version 1.0, http://www.ietf.org/rfc/rfc2246.txt.

Microsoft Passport Technical White Paper, Mar. 2001, http://www.passport.com/downloads/TechnicalWhitePaper.doc.

Netegrity SiteMinder® 5.0, http://www.netegrity.com/products/index.cfm?leveltwo=SiteMinder.

IBM Tivoli Access Manager for Business Integration, http://www.tivoli.com/products/index/access-mgr-bus-integration/.

IBM Tivoli Access Manager for e-business, http://www.tivoli.com/products/index/access-mgr-e-bus/.

IBM Tivoli Access Manager for Operating System, http://www.tivoli.com/products/index/access-mgr-operating-sys/.

Oblix NetPoint™ Product Description, http://www.oblix.com/products/netpoint/net_description.html.

RSA ClearTrust Web Access Management for Secure e-Business, http://www.rsasecuriy.com/products/cleartrust/.

Baltimore SelectAccess Introducing SelectAccess 5.0, http://www.baltimore.com/selectaccess/index.asp.

* cited by examiner

MANAGING SECURE RESOURCES IN WEB RESOURCES THAT ARE ACCESSED BY MULTIPLE PORTALS

BACKGROUND

The present invention relates generally to data communication systems, and particularly to the use of network portals to access secure resources hosted by secure servers.

SUMMARY

In general, in one aspect, the invention features an apparatus for authorizing users of network portals to access a secure resource hosted by a secure server. It comprises an authorization table to store a plurality of user identifiers, each representing a user of an owning portal, and to store for each of the user identifiers an access privilege to the secure resource; wherein the authorization table stores a proxy user identifier representing a guest portal and a guest access privilege to the secure resource for all of the users of the guest portal; a policy manager to receive from the owning portal a first request for access to the secure resource, the first request comprising a first user identifier representing a user of the owning portal, wherein the policy manager grants to the user of the owning portal access to the secure resource according to the access privilege stored in the authorization table for the first user identifier; and wherein the policy manager receives from the guest portal a second request for access to the secure resource, the second request comprising a second user identifier representing a user of the guest portal and a portal identifier representing the guest portal, wherein the policy manager grants to the user of the guest portal access to the secure resource according to the guest access privilege stored in the authorization table for the proxy user identifier.

Particular implementations can include one or more of the following features. The first request comprises a portal identifier representing the owning portal, and implementations can comprise a portal repository to receive the first request, and to authenticate the owning portal using the portal identifier in the first request. Implementations can comprise the owning portal, wherein the owning portal receives from the user of the owning portal a third request for access to the secure resource, the third request comprising the first user identifier and a security credential associated with the user of the owning portal; and a user repository to authenticate the user of the owning portal based on the first user identifier and the security credential associated with the user of the owning portal. Implementations can comprise a portal policy manager to authorize the user of the owning portal based on the first user identifier; and the owning portal sends the first request to the secure server when the user of the owning portal is successfully authorized by the portal policy manager. Implementations can comprise a portal repository to receive the second request, and to authenticate the guest portal using the portal identifier in the second request. Implementations can comprise the guest portal, wherein the guest portal receives from the user of the guest portal a fourth request for access to the secure resource, the fourth request comprising the second user identifier and a security credential associated with the user of the guest portal; and a user repository to authenticate the user of the guest portal based on the second user identifier and the security credential associated with the user of the guest portal. Implementations can comprise a portal policy manager to authorize the user of the guest portal based on the second user identifier; and wherein the guest portal sends the second request to the secure server when the user of the guest portal is successfully authorized by the portal policy manager.

In general, in one aspect, the invention features a method, apparatus, and computer-readable media for authorizing users of network portals to access a secure resource hosted by a secure server. It comprises storing a plurality of user identifiers, each representing a user of an owning portal; storing for each of the user identifiers an access privilege to the secure resource; storing a proxy user identifier representing a guest portal and a guest access privilege to the secure resource for all of the users of the guest portal; receiving from the owning portal a first request for access to the secure resource, the first request comprising a first user identifier representing a user of the owning portal; granting to the user of the owning portal access to the secure resource according to the access privilege stored for the first user identifier; receiving from the guest portal a second request for access to the secure resource, the second request comprising a second user identifier representing a user of the guest portal and a portal identifier representing the guest portal; and granting to the user of the guest portal access to the secure resource according to the guest access privilege stored in the authorization table for the proxy user identifier.

Particular implementations can include one or more of the following features. The first request comprises a portal identifier representing the owning portal, and implementations can comprise receiving the first request; and authenticating the owning portal using the portal identifier in the first request. Implementations can comprise receiving at the owning portal from the user of the owning portal a third request for access to the secure resource, the third request comprising the first user identifier and a security credential associated with the user of the owning portal; and authenticating the user of the owning portal based on the first user identifier and the security credential associated with the user of the owning portal. Implementations can comprise authorizing at the owning portal the user of the owning portal based on the first user identifier; and sends the first request from the owning portal to the secure server when the user of the owning portal is successfully authorized. Implementations can comprise receiving the second request; and authenticating the guest portal using the portal identifier in the second request. Implementations can comprise receiving at the guest portal from the user of the guest portal a fourth request for access to the secure resource, the fourth request comprising the second user identifier and a security credential associated with the user of the guest portal; and authenticating the user of the guest portal based on the second user identifier and the security credential associated with the user of the guest portal. Implementations can comprise authorizing at the guest portal the user of the guest portal based on the second user identifier; and sending the second request from the guest portal to the secure server when the user of the guest portal is successfully authorized by the portal policy manager.

The details of one or more implementations are set forth in the accompanying drawings and the description below. Other features will be apparent from the description and drawings, and from the claims.

Figure 1:
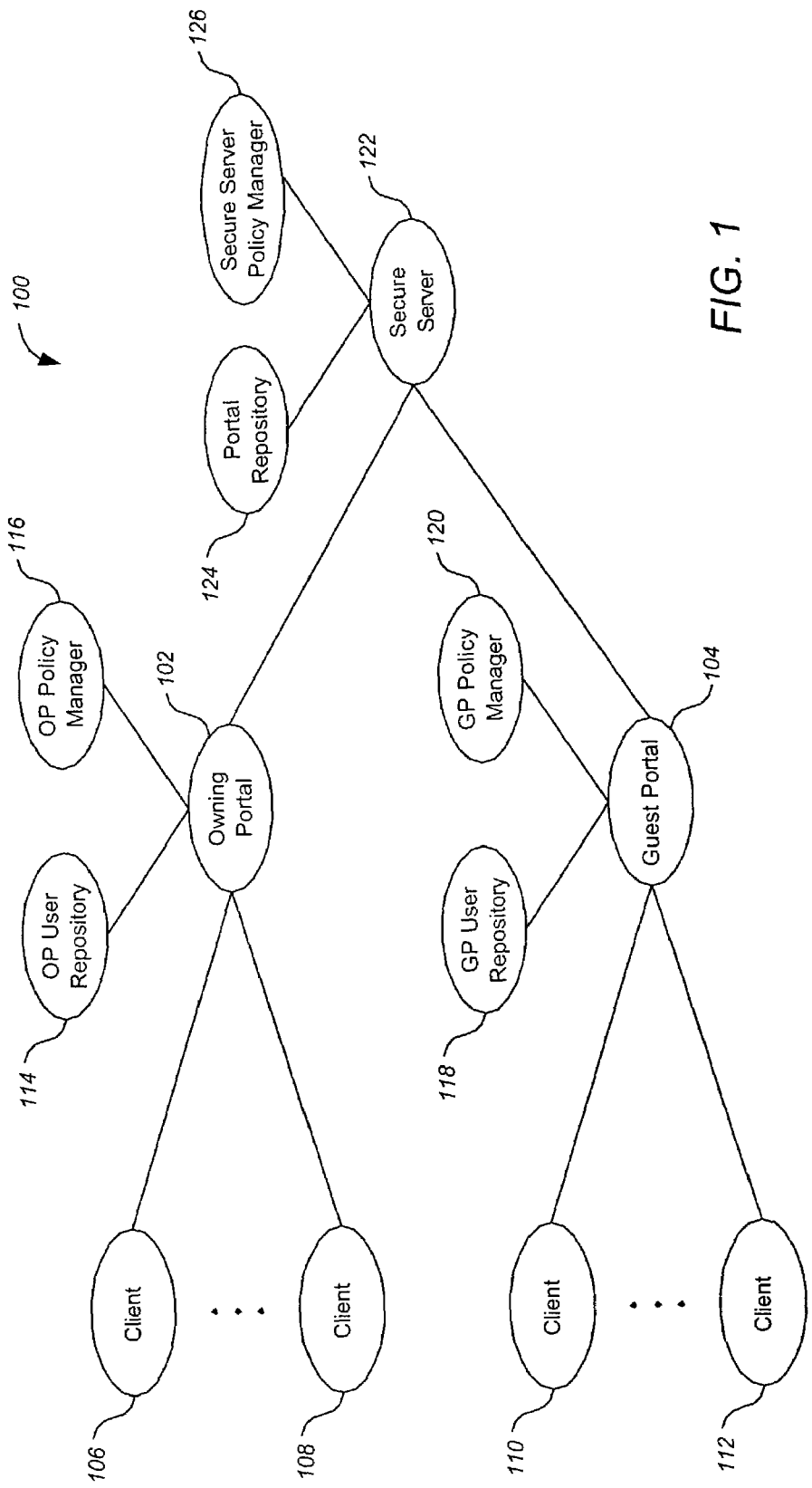
FIG. 1 shows a communication system 100.

The leading digit(s) of each reference numeral used in this specification indicates the number of the drawing in which the reference numeral first appears.

DETAILED DESCRIPTION

As used herein, the terms "client" and "server" generally refer to an electronic device or mechanism, and the term "message" generally refers to an electronic signal representing a digital message. As used herein, the term "mechanism" refers to hardware, software, or any combination thereof. These terms are used to simplify the description that follows. The clients, servers, and mechanisms described herein can be implemented on any standard general-purpose computer, or can be implemented as specialized devices.

FIG. 1 shows a communication system 100. Communication system 100 includes an owning portal 102 and a guest portal 104. Each portal serves one or more clients. Owning portal 102 serves a plurality of clients including clients 106 and 108. Guest portal 104 serves a plurality of clients including clients 110 and 112.

In the implementations discussed in detail herein, a user employs a client to send messages, such as requests for portal resources, to the portal that serves the client. In other implementations, the clients operate automatically, without user intervention. Each portal authenticates its users using a user repository, and authorizes its clients to access portal resources using a portal policy manager. Referring again to FIG. 1, owning portal 102 uses a owning portal (OP) user repository 114 and an owning portal (OP) policy manager 116. Guest portal 104 uses a guest portal (GP) user repository 118 and a guest portal (GP) policy manager 120.

The user repositories 114, 118 are applications that authenticate users; that is, the user repositories verify the identity of users by comparing the authentication information supplied by the users to authentication information stored in the user repository. User authentication information generally includes a user identifier and a security credential for each user. In some implementations, the portals 102, 104 authenticate the users with http basic authentication, the user identifier is a userid, and the security credential is a password. User repositories 114, 118 can be hosted by portals 102, 104, or can be externally-provided applications, such as lightweight directory access protocol (LDAP) services.

The portal policy managers 116, 120 are applications that authorize users to perform certain tasks, such as to access secure information or resources, according to roles and privileges assigned to the users. Each portal policy manager authorizes the clients served by its portal to access portal resources that are provided by the portal. These resources can include providing information to the user and the like. Some of the resources provided by the portal are hosted by other servers. Referring again to FIG. 1, some of the resources provided by portal 102 are secure resources hosted by a secure server 122. A secure resource is a resource that requires the user be authorized to access the secure resource.

One type of secure resource is a project. A project can be created only by a user of the owning portal having the role of community manager, as described below. OP policy manager 116 stores the user identifiers of the community managers that are allowed to create projects on secure server 122. A project acts as a container for other types of secure resources, such as events, milestones, discussions, documents, folders, and the like. Secure resource policy manager 126 stores the user identifiers of the users that are allowed to access the secure resources hosted by secure server 122. For each secure resource hosted by secure server 122, secure server policy manager 126 stores the users allowed to access the secure resource, and the access privileges of each user for that secure resource. In one implementation, access privileges are defined by roles. Each role for a secure resource has an access level and activity security. For example, in a discussion, a user having a role with the highest access level, allowing him to change the name and description of the discussion, and to edit its security policy, while users having a role with a lower access level cannot. Activity security settings allow certain users to start new threads and to reply to messages in the discussion.

Figure 2:
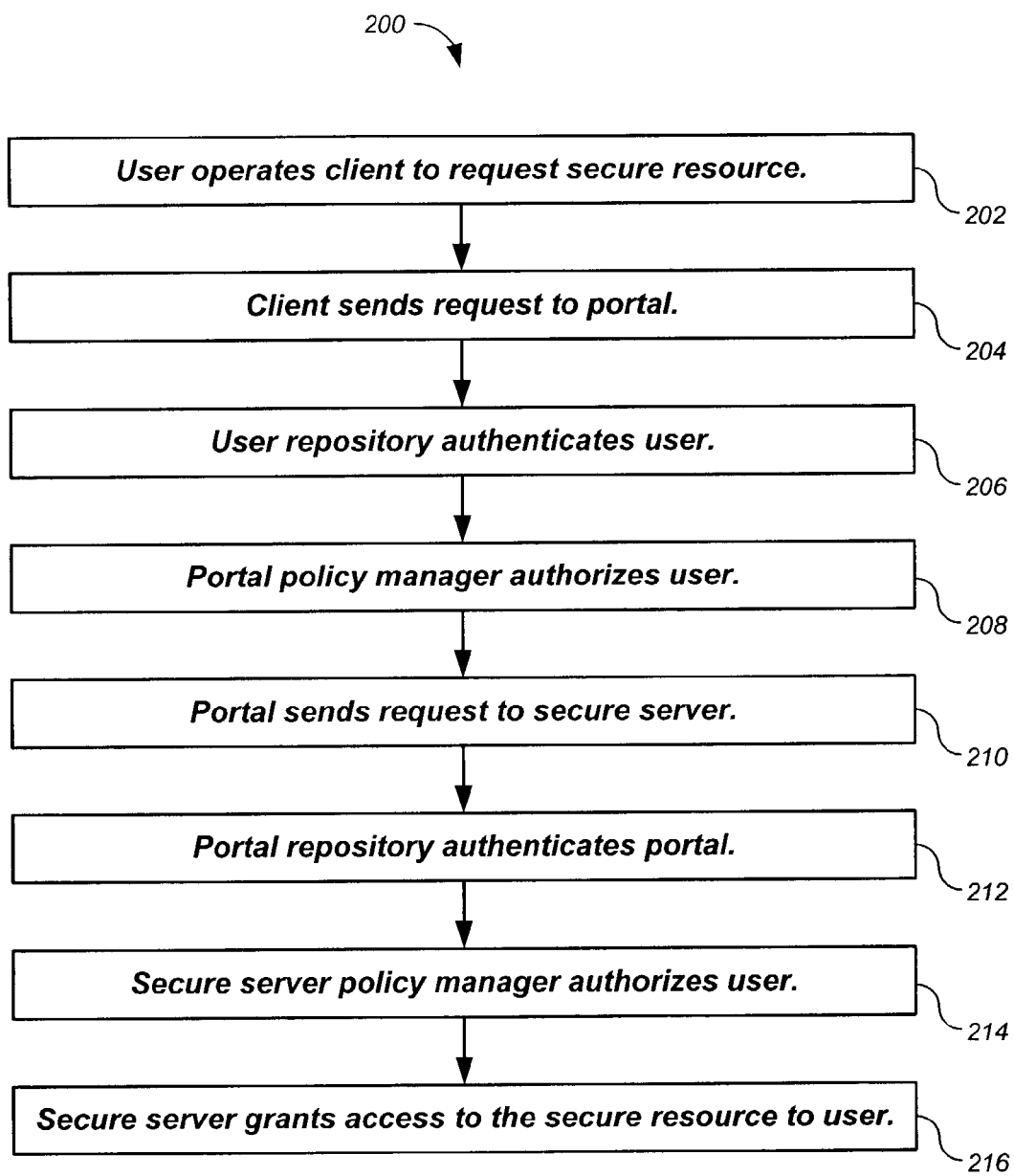
FIG. 2 shows an operation of the communication system of FIG. 1 in granting to a user of client access to a secure resource hosted by secure server according to one implementation.

FIG. 2 shows an operation 200 of communication system 100 in granting to a user of client 106 access to a secure resource hosted by secure server 122 according to one implementation. A user operates client 106 to request the secure resource (step 202). Client 106 sends to portal 102 a message requesting access to the secure resource (step 204). The message includes user authentication information, such as a http basic authentication header including a userid and password for the user, a cookie issued by portal 102 after a previous successful authentication, or the like. User repository 114 attempts to authenticate the user (step 206).

After a successful authentication, policy manager 116 examines the request to determine whether the user must be authorized by portal 102. Requests to access secure resources provided by portal 102 require authorization by portal 102. Therefore portal 102 attempts to authorize the user to communicate with secure server 122 (step 208). Policy managers 116 and 120 store the user identifiers of the users that are allowed to communicate with secure server 122. Policy manager 116 determines whether the user is authorized to communicate with secure server 122. If the authorization fails, portal 102 informs the user.

After a successful authorization, portal 102 then sends the request, and portal authentication information, to secure server 122 (step 210). The portal authentication information includes authentication information for the portal such as a http basic authentication header including a portal identifier and password for the portal, a cookie issued by secure server 122 after a previous successful authentication, or the like. A portal repository 124 attempts to authenticate the portal by comparing the authentication information to information stored in portal repository 124 (step 212). After a successful authentication of portal 102, portal repository 124 trusts portal 102, and so does not attempt to authenticate the user.

After a successful authentication of portal 102, secure server policy manager 126 attempts to authorize the user to access the requested secure resource; that is, policy manager 126 determines whether the user is authorized to access the secure resource requested by the user (step 214). For each secure resource hosted by secure server 122, policy manager 126 includes an authorization table that stores the user identifiers of the users of portal 102 that are authorized to access the secure resource, the role of each user, and the privileges associated with that role. In some implementations, the roles include leader, member and guest, and the privileges include read access and write access. After a successful authorization, secure server 122 grants access to the secure resource to the user according to the user's privileges (step 216).

Certain users of portal 102 can create projects upon secure server 122. Portal policy manager 116 defines roles and privileges for each user served by portal 102. One of the roles is community manager. A community manager has the privilege of creating projects.

Figure 3:
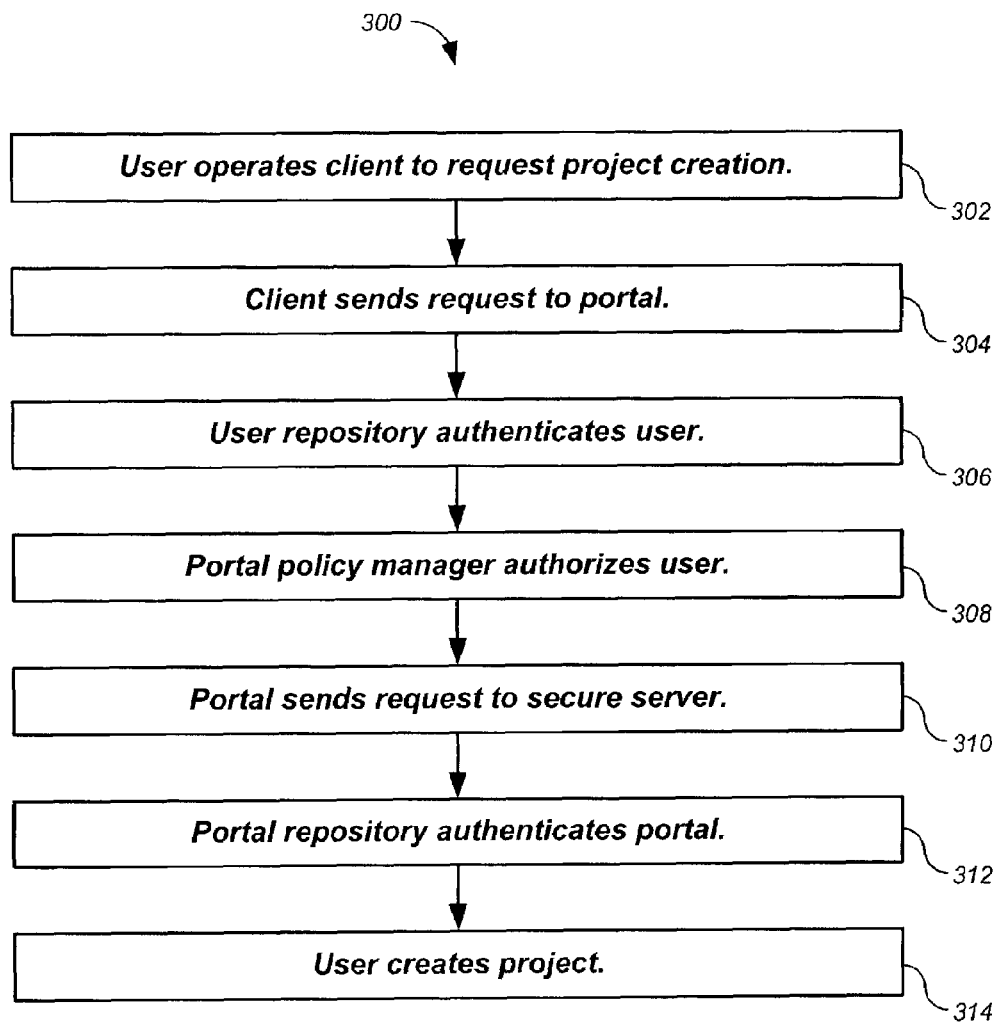
FIG. 3 shows an operation of the communication system of FIG. 1 in creating a project hosted by secure server according to one implementation.

FIG. 3 shows an operation 300 of communication system 100 in creating a project hosted by secure server 122 according to one implementation. A user having the role of community manager (referred to hereinafter simply as "the community manager") operates client 108 to request the creation of a project (step 302). Client 108 therefore sends to portal 102 a message requesting the creation of a project (step 304). The message includes user authentication information. User repository 114 attempts to authenticate the community manager by comparing the authentication information to information stored in user repository 114 (step 306).

After a successful authentication, policy manager 116 examines the request to determine whether the community manager must be authorized. Requests to create a project require authorization by portal 102. Therefore policy manager 116 attempts to authorize the community manager by comparing the community manager's identity to information stored by policy manager 116 (step 308). Policy manager 116 determines that the community manager has the role of community manager, and therefore the community manager has the privilege of creating projects. Therefore policy manager 116 authorizes the community manager.

After a successful authorization, portal 102 then sends the request, and portal authentication information, to secure server 122 (step 310). Because the user is a community manager, portal 102 includes a role identifier in the request that identifies the user as a community manager. Portal repository 124 attempts to authenticate the portal by comparing the authentication information to information stored in portal repository 124 (step 312). After a successful authentication of portal 102, portal repository 124 trusts portal 102, and so does not attempt to authenticate the community manager. The secure server also trusts the role identifier provided by portal 102, and so permits the community manager to create a new project.

The community manager then creates the project (step 314). After a community manager creates a project, he selects the users he wishes to access that project, and assigns a role to each of those users. Secure server policy manager 126 then stores, for the project, the identities of the users that can access the project, the role of each user for that project, and the privileges assigned to each role. This information is stored in an authorization table for the project.

In general, secure server 122 and the secure resources hosted thereon are established by the administrator of the owning portal. In other words, the owning portal "owns" secure server 122 and the secure resources hosted thereon. At times it is desirable to allow users of other portals, referred to herein as "guest portals" to access the secured resources owned by the owning portal. For example, a car company Carco has established owning portal 102 and a secure server 122, and has established a secure resource on the secure server in the form of a production schedule. A parts company Partco supplies car parts to Carco. In order to streamline operations, Carco would like to give Partco limited access to the production schedule.

Figure 4:
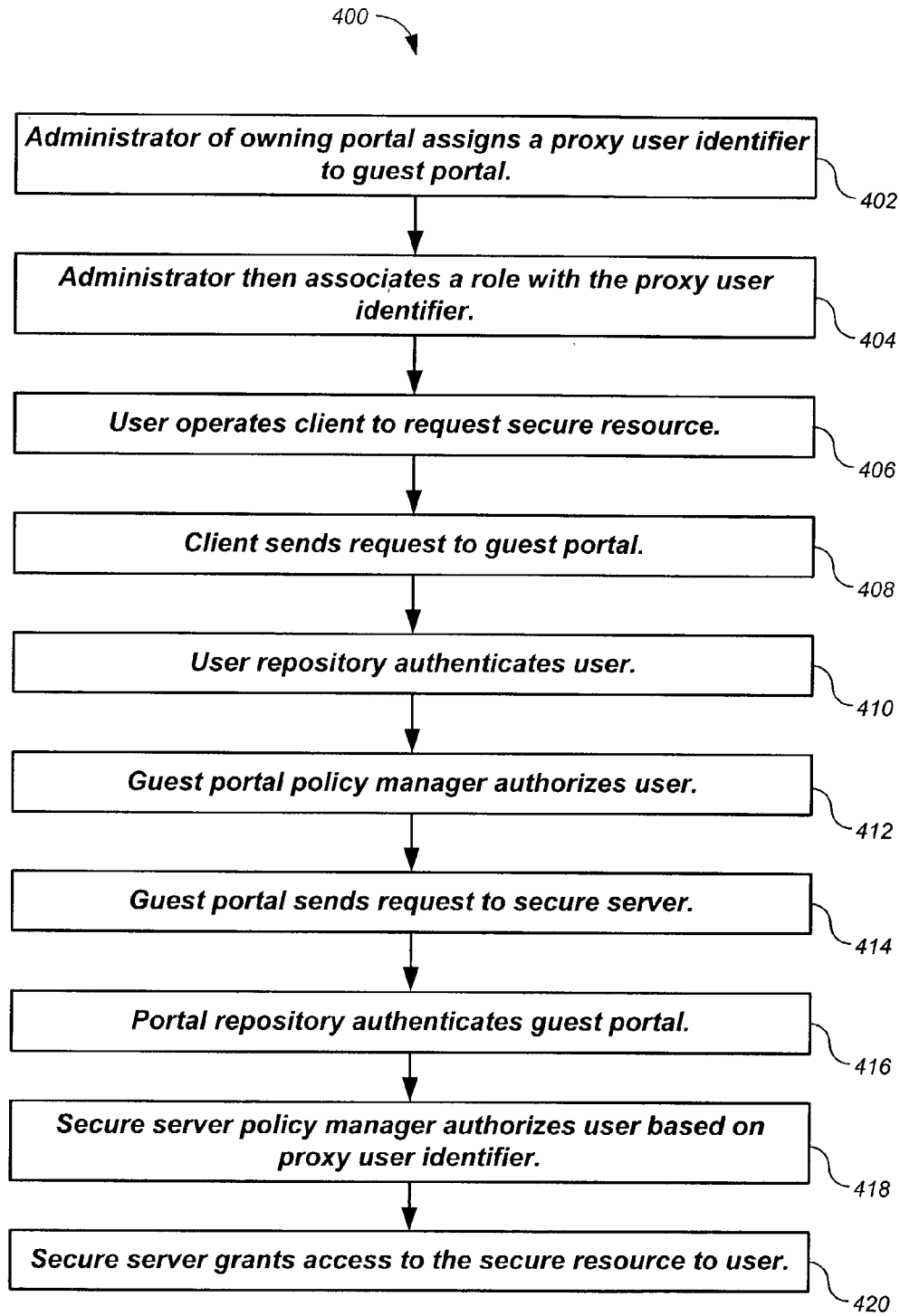
FIG. 4 shows an operation of the communication system of FIG. 1 in providing to users of a guest portal access to a secure resource according to one implementation.

FIG. 4 shows an operation 400 of communication system 100 in providing to users of a guest portal access to a secure resource according to one implementation. An administrator of owning portal 102 assigns a proxy user identifier to guest portal 104 (step 402). The proxy user identifier represents all of the users of guest portal 104. The administrator then associates a role with the proxy user identifier (step 404). The role conveys certain access privileges to the secure resource. Therefore, all of the users of guest portal 104 have the same access privileges to the secure resource. The proxy user identifier is associated with a portal identifier of guest portal 104. The proxy user identifier, portal identifier and role for guest portal 104 are stored in an authorization table within secure server policy manager 126. The portal identifier and a security credential for guest portal 104 are stored in portal repository 124.

A user of one of the clients served by guest portal 104, say client 110, generates a request to access a secure resource hosted by secure server 122 (step 406). Client 110 sends to guest portal 104 a message requesting access to the secure resource (step 408). Guest portal 104 receives the request, and attempts to authenticate the user in a manner similar to that described for owning portal 102 (step 410). After a successful authentication, guest portal 104 attempts to authorize the user in a manner similar to that described for owning portal 102 (step 412). After a successful authorization, guest portal 104 passes the request to secure server 122 (step 414). Portal repository 124 attempts to authenticate the portal, as described above for owning portal 102 (step 416). After a successful authentication, policy manager 126 attempts to authorize the user (step 418).

The request includes a portal identifier for guest portal 104. Policy manager 126 uses the portal identifier in the request to locate the role for the guest portal in the authorization table. If the portal identifier cannot be found, the user is not authorized, and the request for access is denied. However, if the portal identifier is found, access is granted to the user in accordance with the privileges of the role assigned to the proxy user identifier associated with the portal identifier (step 420).

The techniques describe herein permit an enterprise network administrator to grant to other parties limited access to secured enterprise resources without requiring those other parties to expose their user repositories to the enterprise. Returning to the Carco/Partco example, although Partco would like to view the production Carco schedule, Partco may not wish to disclose all of the employee information contained in its user repository.

These techniques also permit an enterprise network administrator to easily provide limited access to other parties. The administrator need not deal with another user repository, but need only deal with large collections of users represented by guest portals, and can assign the same access privileges to all of those users quickly and easily. For example, Carco may wish Partco to view its production schedule, but probably would not allow Partco to modify the schedule.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. An apparatus for authorizing users of network portals to access a project hosted by a secure server, comprising:
   an owning portal including an owning portal (OP) policy manager, an OP repository, and an authorization table, the OP policy manager for determining whether a user is authorized to communicate with the secure server, the OP repository for comparing authentication information to stored information, and the authorization table for storing a plurality of user identifiers, each representing a user of the owning portal, and for storing for each of the user identifiers an access privilege to the project;
   wherein the owning portal is configured for assigning a proxy user identifier to a guest portal, and for associating a role with the proxy user identifier that conveys certain access privileges to the project, the role including an access level and an activity security; and
   wherein the authorization table stores a portal identifier, role, and proxy user identifier representing the guest portal and a guest access privilege to the project for users of the guest portal;
   a secure server established by an administrator of said owning portal including a secure server policy manager to receive from the owning portal a first request for access to the project, the first request comprising a first user identifier representing a user of the owning portal, wherein the secure server policy manager grants to the user of the owning portal access to the project according to the access privilege stored in the authorization table for the first user identifier;
   wherein the secure server policy manager receives from the guest portal a second request for access to the project, the second request comprising a second user identifier representing a user of the guest portal and the portal identifier representing the guest portal, wherein the secure server policy manager grants to the user of the guest portal access to the project according to the guest access privilege stored in the authorization table for the proxy user identifier, and
   wherein the first request comprises a portal identifier representing the owning portal, wherein the apparatus further comprises a portal repository to receive the first request, and to authenticate the owning portal using the portal identifier in the first request.

2. An apparatus for authorizing users of network portals to access a project hosted by a secure server, comprising:
   an owning portal including an owning portal (OP) policy manager, an OP repository, and an authorization table, the OP policy manager for determining whether a user is authorized to communicate with the secure server, the OP repository for comparing authentication information to stored information, and the authorization table for storing a plurality of user identifiers, each representing a user of the owning portal, and for storing for each of the user identifiers an access privilege to the project;
   wherein the owning portal is configured for assigning a proxy user identifier to a guest portal, and for associating a role with the proxy user identifier that conveys certain access privileges to the project, the role including an access level and an activity security; and
   wherein the authorization table stores a portal identifier, role, and proxy user identifier representing the guest portal and a guest access privilege to the project for users of the guest portal;
   a secure server established by an administrator of said owning portal including a secure server policy manager to receive from the owning portal a first request for access to the project, the first request comprising a first user identifier representing a user of the owning portal, wherein the secure server policy manager grants to the user of the owning portal access to the project according to the access privilege stored in the authorization table for the first user identifier;
   wherein the secure server policy manager receives from the guest portal a second request for access to the project, the second request comprising a second user identifier representing a user of the guest portal and the portal identifier representing the guest portal, wherein the secure server policy manager grants to the user of the guest portal access to the project according to the guest access privilege stored in the authorization table for the proxy user identifier, the owning portal, wherein the owning portal receives from the user of the owning portal a third request for access to the project, the third request comprising the first user identifier and a security credential associated with the user of the owning portal; and
   a user repository to authenticate the user of the owning portal based on the first user identifier and the security credential associated with the user of the owning portal.

3. The apparatus of claim 2, further comprising:
   a portal policy manager to authorize the user of the owning portal based on the first user identifier; and
   wherein the owning portal sends the first request to the secure server when the user of the owning portal is successfully authorized by the portal policy manager.

4. An apparatus for authorizing users of network portals to access a project hosted by a secure server, comprising:
   an owning portal including an owning portal (OP) policy manager, an OP repository, and an authorization table, the OP policy manager for determining whether a user is authorized to communicate with the secure server, the OP repository for comparing authentication information to stored information, and the authorization table for storing a plurality of user identifiers, each representing a user of the owning portal, and for storing for each of the user identifiers an access privilege to the project;

wherein the owning portal is configured for assigning a proxy user identifier to a guest portal, and for associating a role with the proxy user identifier that conveys certain access privileges to the project, the role including an access level and an activity security; and wherein the authorization table stores a portal identifier, role, and proxy user identifier representing the guest portal and a guest access privilege to the project for users of the guest portal;

a secure server established by an administrator of said owning portal including a secure server policy manager to receive from the owning portal a first request for access to the project, the first request comprising a first user identifier representing a user of the owning portal, wherein the secure server policy manager grants to the user of the owning portal access to the project according to the access privilege stored in the authorization table for the first user identifier;

wherein the secure server policy manager receives from the guest portal a second request for access to the project, the second request comprising a second user identifier representing a user of the guest portal and the portal identifier representing the guest portal, wherein the secure server policy manager grants to the user of the guest portal access to the project according to the guest access privilege stored in the authorization table for the proxy user identifier; and a portal repository to receive the second request, and to authenticate the guest portal using the portal identifier in the second request.

5. An apparatus for authorizing users of network portals to access a project hosted by a secure server, comprising:

an owning portal including an owning portal (OP) policy manager, an OP repository, and an authorization table, the OP policy manager for determining whether a user is authorized to communicate with the secure server, the OP repository for comparing authentication information to stored information, and the authorization table for storing a plurality of user identifiers, each representing a user of the owning portal, and for storing for each of the user identifiers an access privilege to the project;

wherein the owning portal is configured for assigning a proxy user identifier to a guest portal, and for associating a role with the proxy user identifier that conveys certain access privileges to the project, the role including an access level and an activity security; and wherein the authorization table stores a portal identifier, role, and proxy user identifier representing the guest portal and a guest access privilege to the project for users of the guest portal;

a secure server established by an administrator said owning portal including a secure server policy manager to receive from the owning portal a first request for access to the project, the first request comprising a first user identifier representing a user of the owning portal, wherein the secure server policy manager grants to the user of the owning portal access to the project according to the access privilege stored in the authorization table for the first user identifier;

wherein the secure server policy manager receives from the guest portal a second request for access to the project, the second request comprising a second user identifier representing a user of the guest portal and the portal identifier representing the guest portal, wherein the secure server policy manager grants to the user of the guest portal access to the project according to the guest access privilege stored in the authorization table for the proxy user identifier, the guest portal, wherein the guest portal receives from the user of the guest portal a fourth request for access to the project, the fourth request comprising the second user identifier and a security credential associated with the user of the guest portal; and a user repository to authenticate the user of the guest portal based on the second user identifier and the security credential associated with the user of the guest portal.

6. The apparatus of claim 5, further comprising:

a portal policy manager to authorize the user of the guest portal based on the second user identifier; and wherein the guest portal sends the second request to the secure server when the user of the guest portal is successfully authorized by the portal policy manager.

7. A computer-implemented method for authorizing users of network portals to access a project hosted by a secure server, comprising:

storing a plurality of user identifiers, each representing a user of an owning portal;

storing for each of the user identifiers an access privilege to the project;

determining whether the user is authorized to communicate with the secure server;

comparing authentication information to stored information;

assigning a proxy user identifier for a guest portal;

associating a role with the proxy user identifier that conveys certain access privileges to the project, the role including an access level and an activity security;

storing a portal identifier, role, and proxy user identifier representing the guest portal and a guest access privilege to the project for users of the guest portal;

receiving from the owning portal a first request for access to the project, the first request comprising a first user identifier representing a user of the owning portal, wherein the first request comprises a portal identifier representing the owning portal;

authenticating the owning portal using the portal identifier in the first request;

granting to the user of the owning portal access to the project according to the access privilege stored for the first user identifier;

receiving from the guest portal a second request for access to the project, the second request comprising a second user identifier representing a user of the guest portal and a portal identifier representing the guest portal; and granting to the user of the guest portal access to the project according to the guest access privilege for the stored proxy user identifier.

8. A computer-implemented method for authorizing users of network portals to access a project hosted by a secure server, comprising:

storing a plurality of user identifiers, each representing a user of an owning portal;

storing for each of the user identifiers an access privilege to the project;
determining whether the user is authorized to communicate with the secure server;
comparing authentication information to stored information;
assigning a proxy user identifier for a guest portal;
associating a role with the proxy user identifier that conveys certain access privileges to the project, the role including an access level and an activity security;
storing a portal identifier, role, and proxy user identifier representing the guest portal and a guest access privilege to the project for users of the guest portal;
receiving from the owning portal a first request for access to the project, the first request comprising a first user identifier representing a user of the owning portal;
granting to the user of the owning portal access to the project, according to the access privilege stored for the first user identifier;
receiving from the guest portal a second request for access to the project, the second request comprising a second user identifier representing a user of the guest portal and portal identifier representing the guest portal;
granting to the user of the guest portal access to the project according to the guest access privilege for the stored proxy user identifier;
receiving at the owning portal from the user of the owning portal a third request for access to the project, the third request comprising the first user identifier and a security credential associated with the user of the owning portal; and
authenticating the user of the owning portal based on the first user identifier and the security credential associated with the user of the owning portal.

9. The method of claim 8, further comprising:
authorizing at the owning portal the user of the owning portal based on the first user identifier; and
sending the first request from the owning portal to the secure server when the user of the owning portal is successfully authorized.

10. A computer-implemented method for authorizing users of network portals to access a project hosted by a secure server, comprising:
storing a plurality of user identifiers, each representing a user of an owning portal;
storing for each of the user identifiers an access privilege to the project;
determining whether the user is authorized to communicate with the secure server;
comparing authentication information to stored information;
assigning a proxy user identifier for a guest portal;
associating a role with the proxy user identifier that conveys certain access privileges to the project the, role including an access level and an activity security;
storing a portal identifier, role, and proxy user identifier representing the guest portal and a guest access privilege to the project for users of the guest portal;
receiving from the owning portal a first request for access to the project, the first request comprising a first user identifier representing a user of the owning portal;
granting to the user of the owning portal access to the project according to the access privilege stored for the first user identifier;
receiving from the guest portal a second request for access to the project, the second request comprising a second user identifier representing a user of the guest portal and portal identifier representing the guest portal;
authenticating the guest portal using the portal identifier in the second request; and
granting to the user of the guest portal access to the project according to the guest access privilege for the stored proxy user identifier.

11. A computer-implemented method for authorizing users of network portals to access a project hosted by a secure server, comprising:
storing a plurality of user identifiers, each representing a user of an owning portal;
storing for each of the user identifiers an access privilege to the project;
determining whether the user is authorized to communicate with the secure server;
comparing authentication information to stored information;
assigning a proxy user identifier for a guest portal;
associating a role with the proxy user identifier that conveys certain access privileges to the project the, role including an access level and an activity security;
storing a portal identifier, role, and proxy user identifier representing the guest portal and a guest access privilege to the project for users of the guest portal;
receiving from the owning portal a first request for access to the project, the first request comprising a first user identifier representing a user of the owning portal;
granting to the user of the owning portal access to the project according to the access privilege stored for the first user identifier;
receiving from the guest portal a second request for access to the project, the second request comprising a second user identifier representing a user of the guest portal and a portal identifier representing the guest portal;
granting to the user of the guest portal access to the project according to the guest access privilege for the stored proxy user identifier;
receiving at the guest portal from the user of the guest portal a fourth request for access to the project, the fourth request comprising the second user identifier and a security credential associated with the user of the guest portal; and
authenticating the user of the guest portal based on the second user identifier and the security credential associated with the user of the guest portal.

12. The method of claim 11, further comprising:
authorizing at the guest portal the user of the guest portal based on the second user identifier; and
sending the second request from the guest portal to the secure server when the user of the guest portal is successfully authorized by the portal policy manager.

13. Tangible computer-readable media embodying instructions executable by a computer to perform a method for authorizing users of network portals to access a project hosted by a secure server, the method comprising:
storing a plurality of user identifiers, each representing a user of an owning portal;
storing for each of the user identifiers an access privilege to the project;
determining whether the user is authorized to communicate with the secure server;
comparing authentication information to stored information;

assigning a proxy user identifier for a guest portal;
associating a role with the proxy user identifier that conveys certain access privileges to the project, the role including an access level and an activity security;
storing a portal identifier, role, and proxy user identifier representing the guest portal and a guest access privilege to the project for users of the guest portal;
receiving from the owning portal a first request for access to the project, the first request comprising a first user identifier representing a user of the owning portal, wherein the first request comprises a portal identifier representing the owning portal;
authenticating the owning portal using the portal identifier in the first request;
granting to the user of the owning portal access to the project according to the access privilege stored for the first user identifier;
receiving from the guest portal a second request for access to the project, the second request comprising a second user identifier representing a user of the guest portal and a portal identifier representing the guest portal; and
granting to the user of the guest portal access to the project according to the guest access privilege for the stored proxy user identifier.

14. Tangible computer-readable media embodying instructions executable by a computer to perform a method for authorizing users of network portals to access a project hosted by a secure server, the method comprising:
storing a plurality of user identifiers, each representing a user of an owning portal;
storing for each of the user identifiers an access privilege to the project;
determining whether the user is authorized to communicate with the secure server;
comparing authentication information to stored information;
assigning a proxy user identifier for a guest portal;
associating a role with the proxy user identifier that conveys certain access privileges to the project, the role including an access level and an activity security;
storing a portal identifier, role, and proxy user identifier representing the guest portal and a guest access privilege to the project for users of the guest portal;
receiving from the owning portal a first request for access to the project, the first request comprising a first user identifier representing a user of the owning portal;
granting to the user of the owning portal access to the project according to the access privilege stored for the first user identifier;
receiving from the guest portal a second request for access to the project, the second request comprising a second user identifier representing a user of the guest portal and a portal identifier representing the guest portal;
granting to the user of the guest portal access to the project according to the guest access privilege for the stored proxy user identifier,
receiving at the owning portal from the user of the owning portal a third request for access to the project, the third request comprising the first user identifier and a security credential associated with the user of the owning portal; and
authenticating the user of the owning portal based on the first user identifier and the security credential associated with the user of the owning portal.

15. The media of claim 14, wherein the method further comprises:
authorizing at the owning portal the user of the owning portal based on the first user identifier; and
sends the first request from the owning portal to the secure server when the user of the owning portal is successfully authorized.

16. Tangible computer-readable media embodying instructions executable by a computer to perform a method for authorizing users of network portals to access a project hosted by a secure server, the method comprising:
storing a plurality of user identifiers, each representing a user of an owning portal;
storing for each of the user identifiers an access privilege to the project;
determining whether the user is authorized to communicate with the secure server;
comparing authentication information to stored information;
assigning a proxy user identifier for a guest portal;
associating a role with the proxy user identifier that conveys certain access privileges to the project, the role including an access level and an activity security;
storing a portal identifier, role, and proxy user identifier representing the guest portal and a guest access privilege to the project for users of the guest portal;
receiving from the owning portal a first request for access to the project, the first request comprising a first user identifier representing a user of the owning portal;
granting to the user of the owning portal access to the project according to the access privilege stored for the first user identifier;
receiving from the guest portal a second request for access to the project, the second request comprising a second user identifier representing a user of the guest portal and a portal identifier representing the guest portal;
authenticating the guest portal using the portal identifier in the second request; and
granting to the user of the guest portal access to the project according to the guest access privilege for the stored proxy user identifier.

17. Tangible computer-readable media embodying instructions executable by a computer to perform a method for authorizing users of network portals to access a project hosted by a secure server, the method comprising:
storing a plurality of user identifiers, each representing a user of an owning portal;
storing for each of the user identifiers an access privilege to the project;
determining whether the user is authorized to communicate with the secure server;
comparing authentication information to stored information;
assigning a proxy user identifier for a guest portal;
associating a role with the proxy user identifier that conveys certain access privileges to the project, the role including an access level and an activity security;
storing a portal identifier, role, and proxy user identifier representing the guest portal and a guest access privilege to the project for users of the guest portal;
receiving from the owning portal a first request for access to the project, the first request comprising a first user identifier representing a user of the owning portal;
granting to the user of the owning portal access to the project according to the access privilege stored for the first user identifier;
receiving from the guest portal a second request for access to the project, the second request comprising a second user identifier representing a user of the guest portal and a portal identifier representing the guest portal;
granting to the user of the guest portal access to the project according to the guest access privilege for the stored proxy user identifier;
receiving at the guest portal from the user of the guest portal a fourth request for access to the project, the fourth request comprising the second user identifier and a security credential associated with the user of the guest portal; and
authenticating the user of the guest portal based on the second user identifier and the security credential associated with the user of the guest portal.

18. The media of claim 17, wherein the method further comprises:

authorizing at the guest portal the user of the guest portal based on the second user identifier; and sending the second request from the guest portal to the secure server when the user of the guest portal is successfully authorized by the portal policy manager.

* * * * *